United States Patent
Micnerski

(10) Patent No.: US 10,493,476 B2
(45) Date of Patent: Dec. 3, 2019

(54) PUMP STYLE DISPENSE MECHANISM FOR FLOWABLE PRODUCT PACKAGING

(71) Applicant: Liqui-Box Corporation, Richmond, VA (US)

(72) Inventor: Kenneth Micnerski, Hammondsport, NY (US)

(73) Assignee: LIQUI-BOX CORPORATION, Richmond, VA (US)

( * ) Notice: Subject to any disclaimer, the term of this patent is extended or adjusted under 35 U.S.C. 154(b) by 0 days.

(21) Appl. No.: 15/925,944

(22) Filed: Mar. 20, 2018

(65) Prior Publication Data

US 2018/0264495 A1    Sep. 20, 2018

Related U.S. Application Data

(60) Provisional application No. 62/473,840, filed on Mar. 20, 2017, provisional application No. 62/509,982, filed on May 23, 2017.

(51) Int. Cl.
*B05B 11/00* (2006.01)
*F04B 9/14* (2006.01)
*F04B 53/10* (2006.01)
*F04B 19/22* (2006.01)
*B67D 1/12* (2006.01)
(Continued)

(52) U.S. Cl.
CPC .... *B05B 11/3015* (2013.01); *B05B 11/00412* (2018.08); *B05B 11/3067* (2013.01); *B67D 1/1277* (2013.01); *F04B 9/14* (2013.01); *F04B 19/22* (2013.01); *F04B 53/1072* (2013.01); *G01F 11/021* (2013.01); *B67D 1/0004* (2013.01); *B67D 1/102* (2013.01)

(58) Field of Classification Search
CPC ............ B05B 11/3088; B05B 11/3001; B05B 11/3015; B05B 11/3067; B05B 11/3077; B05B 11/309; G01F 11/025; G01F 11/021; F04B 9/14; F04B 19/22; F04B 33/00; F04B 53/1072; F04B 53/1037; F04B 53/106; F04B 53/1065; B67D 1/101; B67D 1/102
See application file for complete search history.

(56) References Cited

U.S. PATENT DOCUMENTS 1,194,781 A * 8/1916 Pearsons ............. B05B 11/3015 222/385
1,307,478 A * 6/1919 Berdahl .............. B05B 11/3015 222/385

(Continued)

*Primary Examiner* — Patrick M. Buechner
(74) *Attorney, Agent, or Firm* — BakerHostetler

(57) ABSTRACT

A dispenser includes a body having a an exterior surface, an interior surface, a first chamber, a first opening in fluid communication with the first chamber and extending through the body, a second opening in fluid communication with the first chamber and extending through the body, a first valve and a second valve disposed on the body, the valves having a closed and an open configuration, and an actuator disposed at least partially within the first chamber. The actuator may be configured to increase and decrease pressure in the first chamber such that the first valve and the second valve change from their respective closed configurations to their respective open configurations and from their respective open configurations to their respective closed configurations. When in the closed configuration, flow through the valves is impeded.

8 Claims, 8 Drawing Sheets

(51) Int. Cl.
　　*G01F 11/02*　　(2006.01)
　　*B67D 1/10*　　(2006.01)
　　*B67D 1/00*　　(2006.01)

(56) References Cited

U.S. PATENT DOCUMENTS

| | | | | |
|---|---|---|---|---|
| 1,613,898 A * | 1/1927 | Metcalf | F04B 9/14 | 137/322 |
| 1,635,496 A * | 7/1927 | Peigne | F16D 3/72 | 464/58 |
| 1,817,293 A * | 8/1931 | Coffin | A47G 19/183 | 222/310 |
| 2,362,750 A * | 11/1944 | Hayward | F04B 49/243 | 417/559 |
| 2,556,050 A * | 6/1951 | Ziherl | B05B 1/3442 | 239/493 |
| 2,639,063 A * | 5/1953 | Yuza | B05B 11/3015 | 222/385 |
| 3,092,330 A * | 6/1963 | Ridenour | B05B 11/3015 | 239/333 |
| 3,144,867 A * | 8/1964 | Trupp | A61C 17/02 | 433/88 |
| 3,258,175 A * | 6/1966 | Taylor | B05B 11/0072 | 222/380 |
| 3,337,096 A * | 8/1967 | Brown | B01L 3/0282 | 222/380 |
| 3,485,419 A * | 12/1969 | Taylor | B05B 11/0075 | 222/340 |
| 4,105,146 A * | 8/1978 | Broillard | G01F 11/025 | 222/383.1 |
| 4,231,724 A * | 11/1980 | Hope | F04B 53/1065 | 417/435 |
| 4,869,404 A * | 9/1989 | Elliott | B05B 11/3015 | 222/385 |
| 5,207,659 A * | 5/1993 | Pennaneac'h | A61F 9/0008 | 604/298 |
| 6,405,897 B1 * | 6/2002 | Jepson | A47G 19/183 | 141/116 |
| 2007/0007306 A1 * | 1/2007 | Lin | A47K 5/1207 | 222/321.7 |
| 2007/0210106 A1 * | 9/2007 | Foster | B05B 11/3011 | 222/153.06 |
| 2007/0215647 A1 * | 9/2007 | Foster | B05B 11/3011 | 222/383.1 |
| 2007/0215648 A1 * | 9/2007 | Foster | B05B 11/3011 | 222/383.1 |
| 2009/0071977 A1 * | 3/2009 | Abe | A47K 5/1204 | 222/105 |
| 2014/0061246 A1 * | 3/2014 | McNulty | A47K 5/14 | 222/190 |
| 2014/0261799 A1 * | 9/2014 | Ciavarella | A47K 5/1204 | 137/565.01 |
| 2016/0263601 A1 | 9/2016 | Micnerski | | |

\* cited by examiner

PUMP STYLE DISPENSE MECHANISM FOR FLOWABLE PRODUCT PACKAGING

CROSS REFERENCE TO RELATED APPLICATIONS

This application claims the benefit of U.S. Provisional Application No. 62/473,840, filed Mar. 20, 2017, and U.S. Provisional Application No. 62/509,982, filed May 23, 2017, the entireties of which are incorporated herein for any and all purposes.

TECHNICAL FIELD

This disclosure generally relates to devices and methods of dispensing a fluid, and more particularly relates to valve assemblies for dispensing liquids from liquid sources.

BACKGROUND

Flowable products like wine, juice, condiments and liquid chemical products, such as detergents have been dispensed from flexible pouches and are widely known as "bag in box" products. These products rely on typical gravity flow taps located in the bottom of the bag or pouch that is positioned in a box container. A number of undesirable issues occur with such dispensing of liquids using gravity flow that include product remaining in the pouch due to lack of head pressure or inability of the pouch packaging material to collapse around the product as it is being drained from the pouch. Also, the dispensing tap must be placed at the bottom of the pouch to drain the pouch completely. Further, as liquid is dispensed from the pouch flow becomes slower particularly, when the pouch is about empty. By having to position the dispensing tap at the bottom of the container containing the pouch, a wine glass, for example, has to be placed below the container which under a number of conditions is cumbersome and consumes space that might otherwise be used; for example, the box or carton must be placed at the edge of a table or counter top or the carton is elevated by hand over the glass using the persons free hand to manipulate the gravity dispense tap.

It would be desirable to have a fluid dispensing system wherein the tap could be positioned anywhere on the pouch such as the top or side of the pouch so that a variety of configurations could be used and still drain the pouch completely and wherein flow would be at a continuous rate even when the pouch is close to being empty thereby allowing the pouch or carton containing the pouch to be placed anywhere on a table or countertop without the need for elevating the carton over the glass or container while still having the ability to have the glass directly under the dispense tap. The unique pump evacuation system of this invention obviates the above problems with gravity fed pouches that are in a box or as stand-alone pouches.

SUMMARY

A dispenser according to an embodiment of the disclosure includes a body having a an exterior surface and an interior surface defining a first chamber; a first opening extending through the body between the exterior surface and the interior surface, the first opening being in fluid communication with the first chamber; a second opening extending through the body between the exterior surface and the interior surface, the second opening being in fluid communication with the first chamber; a first valve disposed on the body, the first valve having a closed configuration and an open configuration; a second valve disposed on the body, the second valve having a closed configuration and an open configuration; and an actuator disposed at least partially within the first chamber. The actuator may be configured to operatively increase and decrease pressure in the first chamber such that the first valve and the second valve change from their respective closed configurations to their respective open configurations and from their respective open configurations to their respective closed configurations. When the first valve is in the closed configuration, the first opening may be substantially impeded such that fluid does not pass through the first opening, and when the first valve is in the open configurations, the first opening may substantially unimpeded such that the fluid can pass through the first opening. When the second valve is in the closed configuration, the second opening may be substantially impeded such that fluid does not pass through the second opening, and when the second valve is in the open configurations, the second opening may be substantially unimpeded such that the fluid can pass through the second opening.

According to another embodiment, a method of dispensing a fluid from a dispenser includes moving an actuator disposed at least partly in a first chamber in a first direction, such that the fluid moves through a first opening into the first chamber and moving the actuator in a second direction opposite the first direction, such that the fluid moves out of the first chamber through a second opening. The dispenser may have a body with an exterior surface and an interior surface defining a first chamber.

A container assembly or a liquid evacuation system for flexible pouches containing liquids comprising a flexible pouch for holding liquids, a spout attached to the pouch for removing liquid from the pouch in any position such as the top, bottom or side of the pouch whereby the liquid can be drained from the pouch under controlled conditions and the pouch can be drained completely of liquid wherein a mechanical pumping mechanism is positioned in relation to the spout for removal of liquid from the pouch and a tap that is positioned in relation to the mechanical pumping mechanism to dispense liquid into a container on activation of the mechanical pumping mechanism and wherein the pumping mechanism comprises a diaphragm pump or a piston dispensing pump.

A dispenser for dispensing liquids according to one aspect of this disclosure includes a dispenser body having an outer surface and an inner surface, the inner surface defining a first chamber; a plunger slidably positioned within the first chamber such that at least a portion of the plunger slidably contacts the inner surface of the dispenser body; a first valve configured to allow a liquid to flow into the first chamber; and a second valve configured to allow a liquid to flow out of the first chamber; wherein the first valve is configured to open when the plunger moves in a direction away from the first valve; and wherein the second valve is configured to open when the plunger moves in a direction toward the first valve.

In some embodiments, the first valve and the second valve may be one-way valves configured to permit flow of liquid in a first direction and resist flow of liquid in a second direction opposite the first direction. The dispenser may further include a sealing member configured to contact a portion of the inner surface and a portion of the plunger. In some embodiments, the sealing member may be an O-ring. In other embodiments, the sealing member may be a wiper seal. The dispenser may further include a handle attached to the plunger. The dispenser may further include an inlet through which liquid enters the first chamber and an outlet through which liquid exits the first chamber. In some embodiments, the first valve may be disposed at least partially within or on the inlet and the second valve may be disposed at least partially within or on the outlet. The dispenser may further include a second chamber in fluid connection with the outlet, such that when liquid is moved from the first chamber out through the outlet, the liquid enters the second chamber. The dispenser may further include a spout on the second chamber. The spout may be configured to permit liquid to move from the second chamber out of the dispenser.

According to another aspect of the disclosure, a method of dispensing a fluid includes the steps of: moving a fluid into a chamber, the chamber being defined by an internal surface of a dispenser and pushing a plunger positioned within the chamber in a first direction such that the volume of the chamber decreases as the plunger moves.

In some embodiments, the method may further include the step of moving the plunger in a second direction opposite the first direction, wherein moving the plunger in the second direction moves the fluid through an outlet positioned on the dispenser.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. Furthermore, the drawings are not necessarily drawn to scale. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Figure 1:
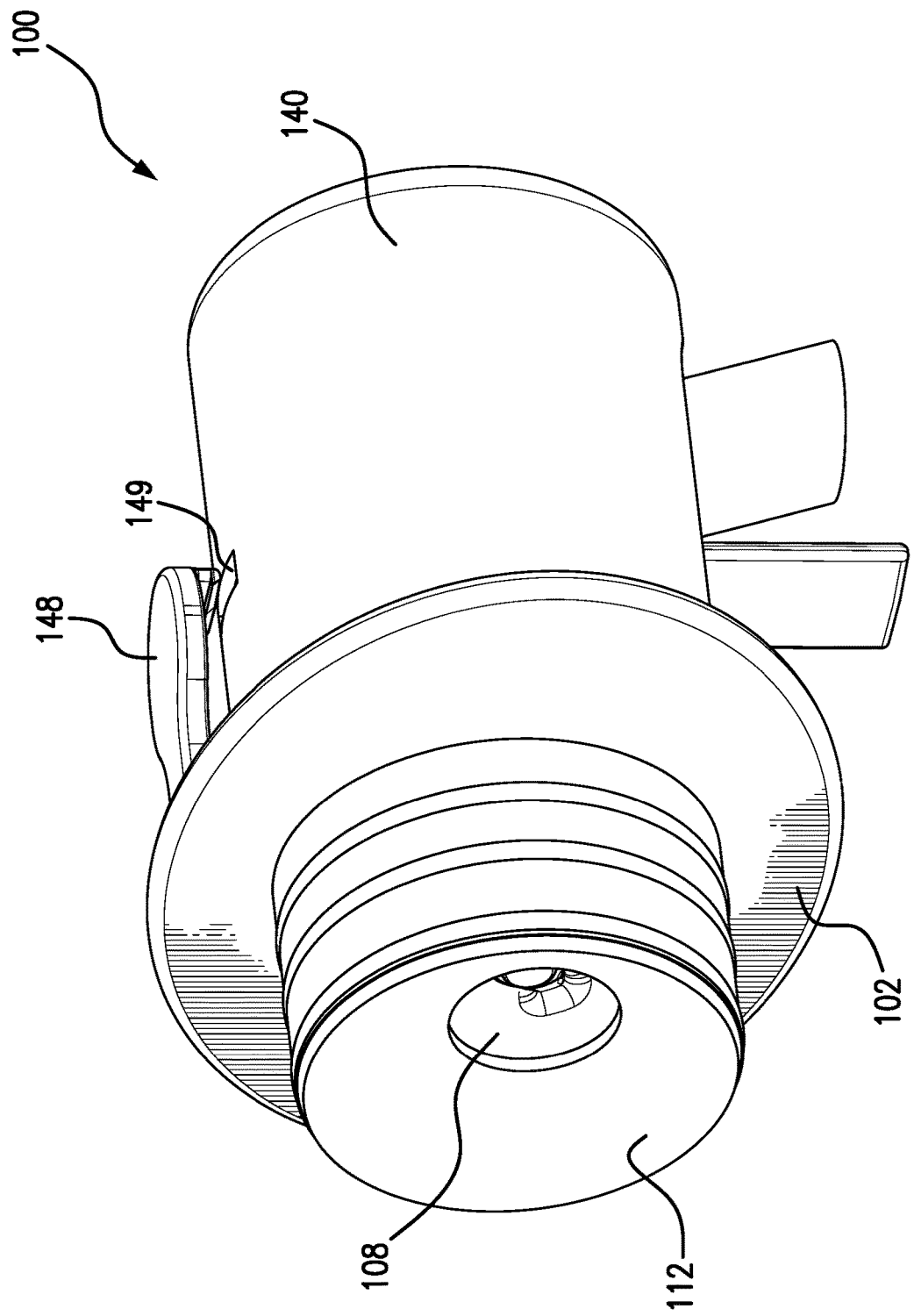
FIG. 1 illustrates an isometric view of a dispenser according to an embodiment of the disclosure.
Figure 2:
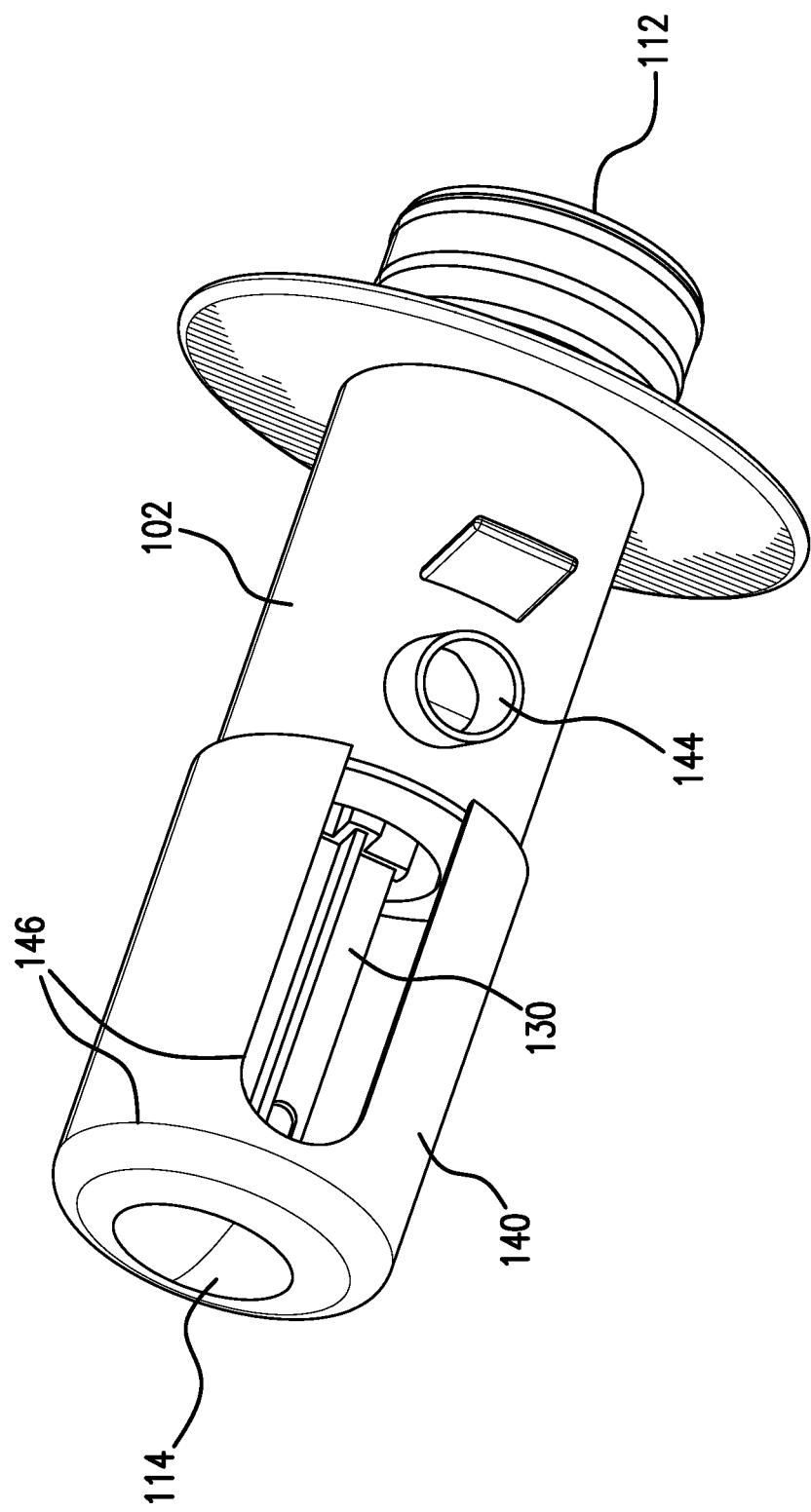
FIG. 2 illustrates a different isometric view of the dispenser of FIG. 1.
Figure 3:
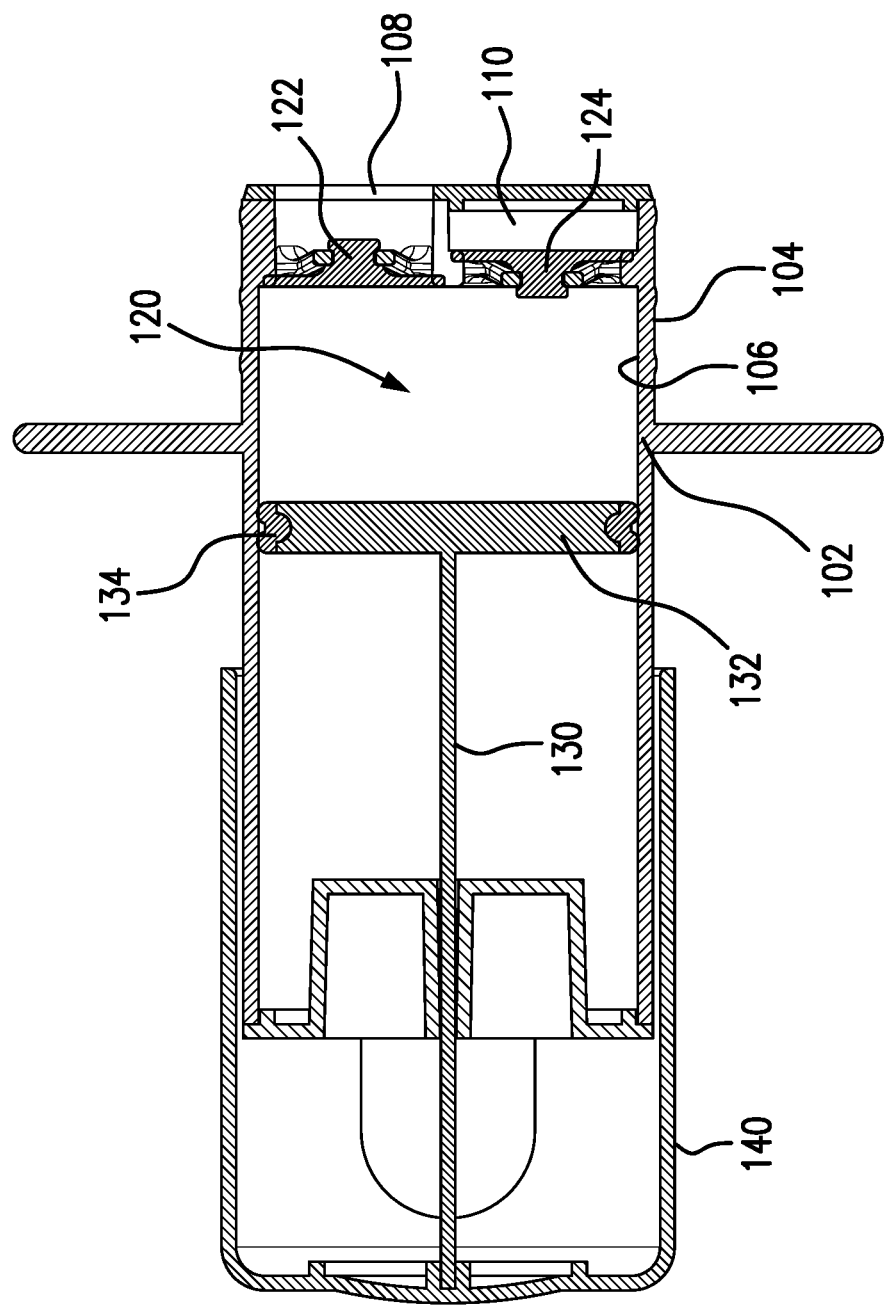
FIG. 3 illustrates a top-down cross-sectional view of a dispenser according to an embodiment.
Figure 4:
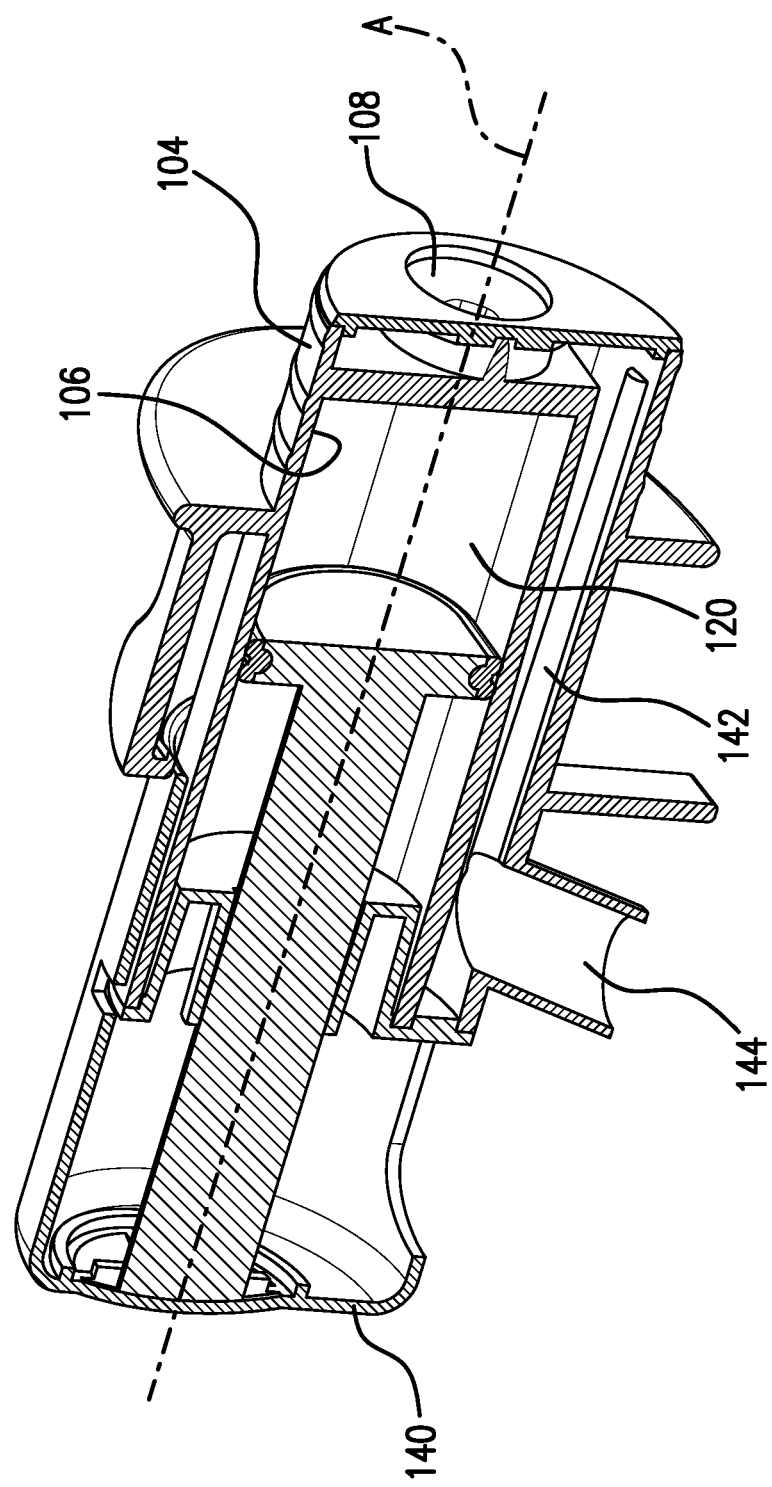
FIG. 4 illustrates a side cross-sectional view of a dispenser according to an embodiment.
Figure 5:
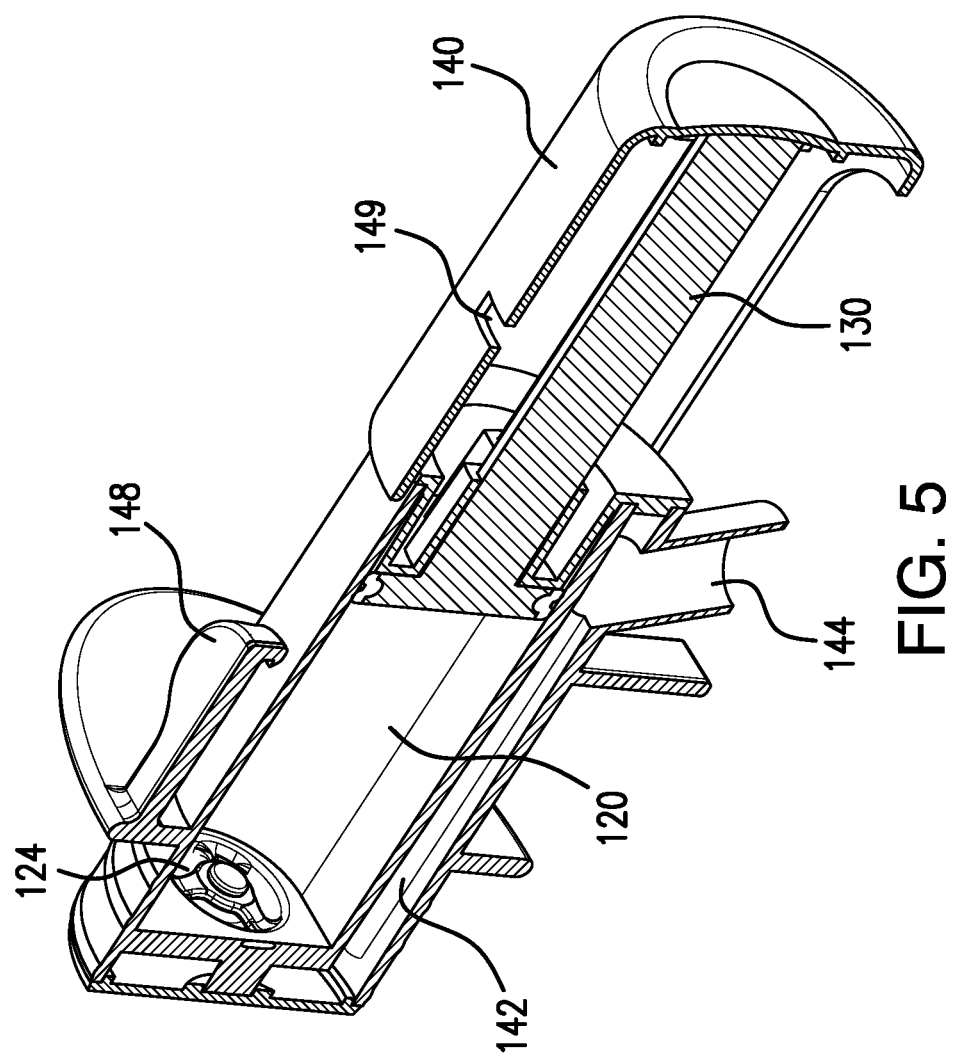
FIG. 5 illustrates a different side cross-sectional view of the dispenser of FIG. 4.

Aspects of the disclosure will now be described in detail with reference to the drawings, wherein like reference numbers refer to like elements throughout, unless specified otherwise. Certain terminology is used in the following description for convenience only and is not limiting.

Certain terminology is used in the description for convenience only and is not limiting. The words "proximal" and "distal" generally refer to positions or directions toward and away from, respectively, an individual using the mixing system. The words "axial", "vertical", "transverse", "left", "right", "above," and "below" designate directions in the drawings to which reference is made. The term "substantially" is intended to mean considerable in extent or largely but not necessarily wholly that which is specified. The terminology includes the above-listed words, derivatives thereof and words of similar import.

The term "plurality," as used herein, means more than one. The singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

The invention is directed to a container assembly for dispensing liquids from a pouch and to a liquid evacuation system for flexible pouches containing flowable liquids. A variety of pouch designs can be used. The pouch design that is of particular interest is a flexible bag in a box wherein a flexible bag or pouch is positioned in a box or other container to hold the bag. Such a bag in a box is currently used for wines and juices of various types. However, other liquids, such as liquid soaps, cleaning agents, oils, ointments and cosmetics can be dispensed from flexible pouches and in a bag in a box configuration. Also, a free standing flexible pouch can be used without a box or other supporting means. Other flexible pouch designs and containers and supports also may be used.

Typically, a flexible bag in a box configuration comprises a flexible bag positioned in a box or other holder configuration. A spout is attached to the bag through a hole in the box or container to allow flow of liquid from the pouch. Currently, with such a configuration, the dispensing of liquid through the tap is made possible by gravity flow from the pouch into a container which requires the spout to be positioned at or near the bottom of the flexible bag and box. This results in a number of problems. There must be sufficient room below the pouch to place the container to receive the liquid being dispensed and this may be inconvenient depending on available space available. Under some circumstances it may be very desirable to place the spout at the top or side of the container which would not be possible when a gravity feed is used. Also, there are often problems with complete collapse of the flexible bag to create an equilibrium between the outside pouch pressure and inside the pouch pressure resulting in a diminished or complete stoppage of liquid flow. The result is that the pouch must be taken out of the box and cut open or squeezed to extract the retained contents of liquid. Further, as less liquid is in the bag, flow of the liquid by force of gravity becomes slower. Also, there is not a convenient method to dispense exact amounts of liquid to each container, for example, it is difficult to dispense the identical amount of wine into each glass. By using a pumping system of this disclosure, the above problems are readily avoided and accurate metering of liquids can be achieved by sizing the dispensing part of the mechanical pumping to a desired amount of fluid.

The liquid evacuation system of this invention for liquid containing flexible pouches comprising a spout attached to the flexible pouch in any position whereby the liquid can be drained from the pouch under controlled conditions and the pouch can be drained completely of liquid. This is accomplished by a mechanical pumping mechanism that is positioned in relation to the spout and can be positioned in the spout itself if desired. When the mechanical pumping mechanism is activated, liquid is pumped from the pouch into a container. There are no problems with pumping all of the liquid from the pouch and completely emptying the pouch as a vacuum is created by pulling the liquid out of the pouch and creating a condition wherein as the flexile pouch collapses around the liquid, the liquid is completely evacuated from the pouch. In the event there is a problem with the removal of all of the liquid from the pouch, a helical coil or dip strip can be inserted into the pouch. The pumping mechanism can be positioned at any place on the pouch and is not limited to the bottom of the pouch as with the current gravity feed pouches. This allows placement of the pouch in a variety of positions and allows, for example, filling of a container with liquid from the top of the pouch which could not be accomplished with the current gravity feed dispensing of liquids. Further, the pump would allow liquids to flow at a constant rate since the pump dispenses liquid at a constant rate and the liquid would not flow slower as the pouch is emptied as occurs with a gravity feed. Also, a pump can be controlled to dispense a certain amount of liquid, for example, 6 oz. of soda or beer and 2 oz. of liquor and the like. Also, exact amounts of liquid chemicals can be dispensed, for example, cleaning liquids, solvents, oils and the like. Pumping mechanisms that can be used in this invention comprise diaphragm pumps or a piston pump but are not limited to such pumping mechanisms. The pumping mechanism can be activated by a motor to automatically dispense an exact amount of liquid desired.

An embodiment of a dispenser includes a cap fixedly attached to a dispenser body. The dispenser body has an outer surface and an inner surface, the inner surface defining a first chamber and a second chamber, the first and second chambers being separated by a barrier. The dispenser includes a plunger within the inner surface of the dispenser body, the plunger extending through the barrier such that at least a portion of the plunger is in the first chamber and a portion of the plunger is in the second chamber. The plunger may have a plunger seal slidably contacting the inner surface of the dispenser body within one of the first chamber or the second chamber. The plunger seal may include a first valve extending through the plunger seal. The first valve may be a one-way check valve. The first valve may be configured to open when a force threshold is surpassed. The plunger may have a pull tab attached to it and configured to longitudinally translate the plunger in a first direction or a second direction while the plunger is within the dispenser body. The pull tab may be operatively connected to a spring. The spring may contact the cap such that when the pull tab is moved in a first direction it applies a force on the spring, and the spring applies a force on the cap as the spring compresses. The dispenser body may also include an outlet nozzle connecting the outer surface of the dispenser body with the inner surface. The outlet nozzle may have an outlet nozzle cap and an outlet nozzle cap seal. The outlet nozzle may be positioned such that the outer surface is connected to the inner surface of the first chamber or the second chamber. The dispenser may also include a cover at the opposite end of the dispenser body from the cap. The cover may include a second valve. The second valve may be a one-way valve. The second valve may open when a force threshold is surpassed.

In some embodiments, the dispenser may have a body with an inlet, an outlet, and an internal surface. The internal surface defines a chamber configured to receive and hold a fluid. An actuator in the form of a plunger is positioned in the chamber and is configured to slide within the chamber. While the exemplary embodiments describe the actuator as a plunger, it will be understood that other actuating mechanisms can also be used, for example, push-buttons, levers, or other suitable actuating devices. The plunger may contact the internal surface of the body such that it creates a barrier that prevents fluid from passing behind the plunger.

The plunger may include a plunger valve. The plunger valve may be a one-way valve configured to allow fluid to pass through the plunger in a first direction while resisting passage of fluid in a second direction. In some embodiments, the plunger may include a plurality of plunger valves.

The outlet of the dispenser may include an outlet valve. The outlet valve may be a one-way valve configured to allow fluid to pass through the outlet in a first direction while resisting passage of fluid in a second direction. The outlet valve may be configured to open when an outlet threshold pressure value within the chamber is surpassed. The outlet valve may include a spring element attached to it. If the outlet threshold pressure is surpassed, the spring element compresses and opens the outlet valve to allow fluid to pass through the outlet in the first direction. When the pressure in the chamber decreases to less than the threshold pressure value, the spring element decompresses, thus closing the outlet valve and inhibiting fluid flow through the outlet.

The chamber in the dispenser may include a first portion and a second portion, the first and second portions being separated by the plunger. Fluid enters the dispenser through the inlet and into the first portion of the chamber. As the plunger moves in the first direction, the volume of the first portion decreases and the pressure increases. Once a chamber threshold pressure value is surpassed, the plunger valve opens and allows fluid to flow from the first portion of the chamber into the second portion.

In operation, the pull tab is forcefully moved in the direction of the cap such that the spring positioned between the pull tab and the cap is compressed. In some embodiments, the pull tab may be fixedly attached to the plunger, such that when the pull tab is moved the plunger is also moved. When the plunger moves, the plunger seal connected to the plunger slides along the inner surface of the dispenser body. In some embodiments, the pull tab can slide only within the first chamber while the plunger seal can slide only within the second chamber. The plunger extends through the barrier between the first chamber and the second chamber and connects the pull tab and the plunger seal. As the plunger moves in a direction towards the cap, the plunger seal moves away from the cover and defines a fill chamber. The movement of the plunger seal away from the cover creates a pressure differential within the fill chamber. The pressure differential causes the second nozzle in the cover to open and allow fluid to pass through it into the fill chamber. When the pull tab no longer has a force acting on it in the direction of the cap, the compressed spring between the cap and the pull tab decompresses and thus pushes the pull tab connected to the plunger, which is connected to the plunger seal the a direction opposite the first direction such that the plunger seal moves towards the cover. The movement of the plunger seal toward the cover decreases the volume of the fill chamber that contains fluid. The increase in pressure causes the first valve in the plunger seal to open and allow the fluid to pass through. The fluid passes from the fill chamber to the second chamber. When the pull tab is actuated in the first direction toward the cap again, the plunger seal applies a pressure on the fluid within the second chamber. This pressure causes the outlet nozzle to open and allow the fluid to exit the dispenser.

In other embodiments, the dispenser body may have an outer surface and an inner surface defining a first chamber. A plunger slidably contacts the inner surface of the dispenser body such that fluid substantially cannot pass between the plunger and the inner surface. The plunger may have a handle fixedly attached to it. The dispenser body may have an opening connecting the outer surface with the inner surface, the plunger being slidable within the opening. The dispenser body may include a cover having a first valve and a seal. The valve may be a one-way valve. The dispenser body may include a second valve. The second valve may be a check valve. The body may include a plug that is removable from the dispenser body. The plug is positioned within a bore in the dispenser body that extends from the outer surface through the dispenser body into the inner surface. When the plug is removed from the bore, fluid that is within the first chamber may pass through the bore. The dispenser body may include an outlet passage being defined partly by the inner surface of the dispenser body and partly by a sidewall within the chamber. The sidewall prevents fluid communication between the outlet passage and the first chamber. The sidewall may have an aperture that extends therethrough such that the outlet passage and the first chamber are in fluid communication. The second valve may be positioned within the aperture.

In operation, the handle may receive a force acting in a first longitudinal direction or a second longitudinal direction, the first and second longitudinal direction being opposite one another. The first longitudinal direction may be in a direction away from the cover, and the second longitudinal direction may be in a direction toward the cover. When the handle is moved in the first longitudinal direction, the plunger that is fixedly attached to the handle also moves. As the plunger slides within the chamber of the dispenser body, a negative pressure differential is created within the first chamber. This differential causes the first valve in the cover to open and allow entry of a fluid into the first chamber. When the handle is actuated in the second direction toward the cover, the plunger also slides within the chamber in the second direction. This movement creates a positive pressure differential within the first chamber that is filled with fluid. Added pressure within the first chamber causes the second valve to open and allow fluid to pass through it from the first chamber into the outlet passage. From there, fluid may be dispensed out of the dispenser.

In another embodiment of the present disclosure, the dispenser may have a fluid source fluidly connected to the first valve such that when the first valve opens, fluid enters the first chamber. In some embodiments, the pressure within the fluid source is greater than the pressure within the first chamber when the plunger is moved away from the cover at least a set distance.

In some embodiments, the dispenser includes a spring element. The spring may be within the dispenser body. In some embodiments, the spring is positioned between the handle and the plunger seal. In some embodiments, the spring is positioned within or around the plunger. When the plunger is moved in a first direction, the spring gets compressed. Force may be applied to the plunger to move it in the first direction and compress the spring. Depending on the characteristics of the spring, the force applied may need to surpass a set threshold to compress the spring. When the force is below the threshold, the spring is uncompressed. When a force is applied greater than the threshold force, the spring compresses, and when the force is decreased to below the threshold force, the spring decompresses. As the spring decompresses, it exerts a force on the plunger and moves the plunger in a second direction opposite the first.

The spring element may have various characteristics. In some embodiments, the spring may include plastic, metal, a combination of plastic and metal, or another suitable material. The spring element may be a unitary spring or it may be a combination of individual parts. In some embodiments, the spring element may include individual parts of different materials and structure.

In some embodiments, a dispenser can be composed of various materials. A dispenser can comprise plastic, metal, rubber, a combination of plastic, metal and rubber, metal, or another suitable material. In some embodiments, multiple materials may be used for various components. Some suitable materials include, but are not limited to, silicone, polyethylene, polypropylene, and polyether ether ketone. The plunger may comprise polypropylene, the spring element may comprise polyether ether ketone, the dispenser body may comprise polyethylene, and the cover seal may comprise silicone. It will be understood that such an embodiment is not limiting, and other combinations of materials may be suitably used.

Materials used for various embodiments may include recyclable plastics, such as polyethylene, polypropylene and a variety of copolymers thereof. The materials may also be recycled after the dispenser and related products are no longer in use. With some embodiments, it may not be practical to reuse such a system since the costs involved in cleaning are expensive and high and results cannot be guaranteed.

Referring to FIGS. 1-8, in some embodiments, a dispenser 100 may include a body 102 having a distal end 112 and a proximal end 114. The body 102 may be substantially cylindrical. In some embodiments, the body 102 may be an elliptical prism, a rectangular prism, or another suitable shape. It will be understood that the body 102, as well as other components described herein, are scalable and can be designed to have particular shapes and dimensions that are suitable to achieve proper function of the dispenser 100, and that this disclosure is not limited to the shapes of the illustrative embodiments of the Figures.

The body 102 includes an outer surface 104 and an inner surface 106 that defines an interior portion of the body 102, at least a part of which may be hollow. Referring to the illustrative embodiment of FIGS. 1-8, the inner surface 106 may define a first chamber 120 disposed within a hollow portion of the body 102. The body 102 may be manufactured as a singular integral piece, or, alternatively, it may be composed of separately manufactured components such that it may receive fluid without undesirable leakage or damage.

The outer surface 104 may define one or more openings 108,110 that extend from the outer surface 104 to the inner surface 106. The openings 108,110 may be configured to fluidly communicate with the first chamber 120. In some embodiments, the openings 108,110 may be operatively opened and closed such that communication may be permitted or blocked, respectively, between the first chamber 120 and the environment external to the body 102.

Referring to the exemplary embodiment of FIGS. 1-8, the body 102 may include a first opening 108 and a second opening 110 spaced apart from the first opening 108. The first and second openings 108,110 may extend through from the outer surface 104 to the inner surface 106 through the body 102 such that the first and second openings fluidly communicate with the first chamber 120. In some embodiments, the first and second openings 108,110 may be disposed adjacent one another. Alternatively, the openings may be disposed on different portions of the body 102. In some embodiments, the first opening 108 may be disposed on or adjacent to the distal end 112 of the body 102. The second opening 110 may be disposed on or adjacent to the proximal end 114 of the body 102.

In some embodiments, the first and second openings 108,110 may communicate directly with the first chamber 120. Alternatively, the dispenser 100 may include one or more intermediate passages or chambers 142 disposed between the one or more openings and the first chamber 120. Referring to the exemplary embodiment of FIG. 8, an intermediate passage 142 may be disposed between the second opening 110 and the first chamber 120. In some embodiments, a plurality of intermediate passages 142 may exist. The intermediate passage 142 may be configured to carry a liquid from the first opening 108 to the first chamber 120, from the first chamber 120 to the second opening 110, from the first chamber 120 to another intermediate chamber 142, or between two or more other components of the dispenser 100. The first opening 108 may extend through the outer surface 104 and communicate with the first chamber 120, and the second opening 110 may extend from the first chamber 120 to the intermediate passage 142.

In some embodiments, the intermediate chamber 142 may include a fluid passage external to the dispenser body 102, for example, a tube (not shown) configured to move liquid from a liquid source to the dispenser 100 or from the dispenser 100 to a liquid destination. The openings 108,110 and/or the intermediate chambers 142 may be configured to engage with an additional component for introducing fluid into the dispenser 100 or moving fluid to a fluid destination from the dispenser 100, for example, an intermediate chamber 142 or a spout 144.

The intermediate chamber 142 may be separated from the first chamber 120 by at least one partition. Referring again to FIGS. 1-8, the intermediate chamber 142 may fluidly communicate with the second opening 110. Liquid flowing out of the first chamber 120 may enter the intermediate chamber 142.

The dispenser 100 may further include a plunger 130 disposed at least partially within the first chamber 120. The plunger 130 may include a plunger head 132 disposed on the plunger 130. The plunger 130 may be configured to slidably move within the first chamber 120. The plunger 130 may contact the inner surface 106 of the body 102 when it is inside the first chamber 120. Referring still to FIGS. 1-8, the plunger head 132 may sealably contact the inner surface 106 such that liquid is substantially prevented from moving past or through the plunger head 132 and the plunger 130.

In some embodiments, the plunger 130 may include a spring member 136. The spring member 136 may be disposed on or in the plunger 130. The spring member 136 may be on a portion of the plunger within the first chamber or on a portion of the plunger outside of the first chamber. In some embodiments, the spring member 136 may be biased to apply force on the plunger in a first direction toward the first opening 108. In another embodiment, the spring member 136 may be biased to apply force on the plunger in a second direction opposite the first direction. The spring member 136 may be any suitable structure that is configured to flex in at least one direction and store potential energy such that energy is released as the structure un-flexes, such as, but not limited to, a helical spring, an elastic material, or a memory shape alloy. In some embodiments, the spring member 136 may be helical, corrugated, or another suitable shape.

In some embodiments, the plunger 130 may include a sealing member 134. The sealing member 134 may be disposed on the plunger head 132. The sealing member 134 may be configured to move with the plunger 130 and slidably contact the inner surface 106. In a preferred embodiment, the sealing member 134 substantially prevents movement of liquid around it, such that a liquid-tight seal is created and one side of the sealing member 134 contacts the liquid while the opposite side remains free from contact with the liquid. In some embodiments, the sealing member 134 includes an O-ring. The O-ring may include any suitable material as understood in the art, for example, rubber, silicone, or plastic. In some embodiments, the sealing member 134 may be a wiper seal. The sealing member 134 may be integrated into the plunger 130 itself, for example, into the plunger head 132, or the sealing member 134 may be a separate component configured to engage with the plunger 130.

The dispenser 100 may include a plurality of plungers 130. In some embodiments, the first chamber 120 may be divided into a first portion and a second portion, each portion including a separate plunger 130. In such embodiments, the plungers 130 may be fixedly attached to one another such that they may be actuated simultaneously. It will be understood that the sizes, dimensions, and functionalities may differ between individual plungers 130.

The plunger 130 may be actuated to move within the first chamber 120 in a first direction towards the distal end 112 of the body 102 and in a second direction, opposite the first direction, towards the proximal end 114, the movement being parallel to an axis A extending from the distal end 112 to the proximal end 114. In some embodiments, the first direction of movement may be in a different direction, for example, perpendicularly to the axis A.

In some embodiments, the plunger 130 may extend through the body 102 such that a first portion of the plunger 130 is within the first chamber 120 while a second portion is is external to the body 102. The plunger 130 may include a handle 140 attached thereto. Referring to FIGS. 1-8, the handle 140 may be disposed on the portion of the plunger 130 that is external to the body 102.

The handle 140 may be configured to be gripped by a user and pulled or pushed. The handle 140 may be fixedly attached to the plunger 130, such that when the handle 140 is pushed or pulled, the plunger 130 moves in the first or second direction, respectively, as described above. In an alternative embodiment, the plunger 130 may move in the first or second direction when the handle 140 is pulled or pushed, respectively.

In some embodiments, the handle 140 may be configured to releasably secure the plunger in a position within the first chamber such that the plunger does not move until it is released. Such a feature may be advantageous in scenarios where it may be undesirable for the plunger to move, for example during shipping or storage.

The handle 140 may further include a grip 146 configured to be contacted by a user's hand or finger. In some embodiments, the handle 140 may include multiple grips 146 on opposing sides of the handle 140. Such a grip arrangement would provide better grasp of the handle and would reduce mishandling of the dispenser 100 due to a user's hand or finger slipping when pushing or pulling the handle 140.

The dispenser 100 may include one or more valves configured to control the passage of fluid into or out of the first chamber 120. Referring to FIGS. 1-8, the dispenser 100 may include a first valve 122 disposed on or within the first opening 108. The first valve 122 may be a one-way valve configured to permit flow of a liquid in one direction and to resist the flow of the liquid in the opposite direction. In some embodiments, the first valve 122 may be configured to permit flow of liquid through the first opening 108 into the first chamber 120 and to resist flow of liquid out of the first chamber.

The dispenser 100 may further include a second valve 124 disposed on or within the second opening 110. It will be understood that the second valve may be substantially the same as the first valve. The second valve 124 may be a one-way valve configured to permit flow of a liquid in one direction and to resist the flow of the liquid in the opposite direction. In some embodiments, the second valve 124 may be configured to permit flow of liquid through the second opening 110 out of the first chamber 120. In some embodiments, the first opening 108 and the second opening 110 are adjacent to each other. In some embodiments, the first opening 108 may fluidly communicate with a source of liquid.

The valves 122,124 may be deformable valves having elastic properties and configured to change their shapes upon application of force and to return to their original non-deformed shape upon removal of the force. In some embodiments, the valves 122,124 may be ball valves, check valves, piston valves, flap valves, or other mechanical valves suitable for operatively permitting or blocking passage of a fluid therethrough.

Figure 6:
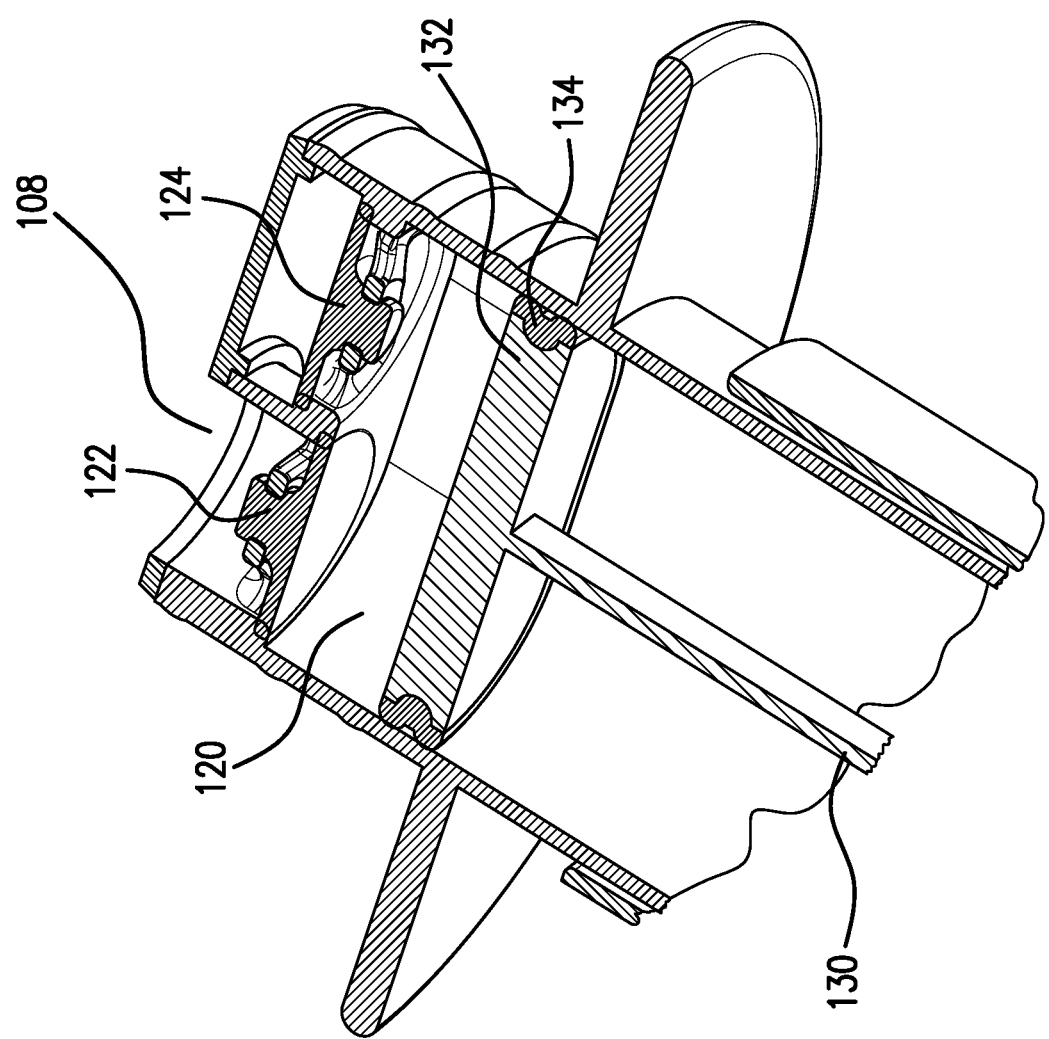
FIG. 6 illustrates a cross-sectional view of a dispenser during fluid moving into the first chamber according to an embodiment of the disclosure.

Referring to FIG. 6, the dispenser 100 is shown as the plunger 130 moves away from the distal end 112. As the plunger 130 moves, the volume in the first chamber 120 increases, resulting in a decrease in pressure within the first chamber 120. The first valve 122 may be an elastically deformable valve. As pressure within the first chamber 120 decreases below a threshold low pressure, the first valve 122 may deform, thus un-obstructing the first opening 108 and permitting fluid to enter the first chamber 120. When pressure within the first chamber 120 rises above the threshold low pressure, the first valve 122 returns to its un-deformed state such that the first opening 108 is obstructed by the first valve 122 and fluid cannot flow through the first opening 108.

Figure 7:
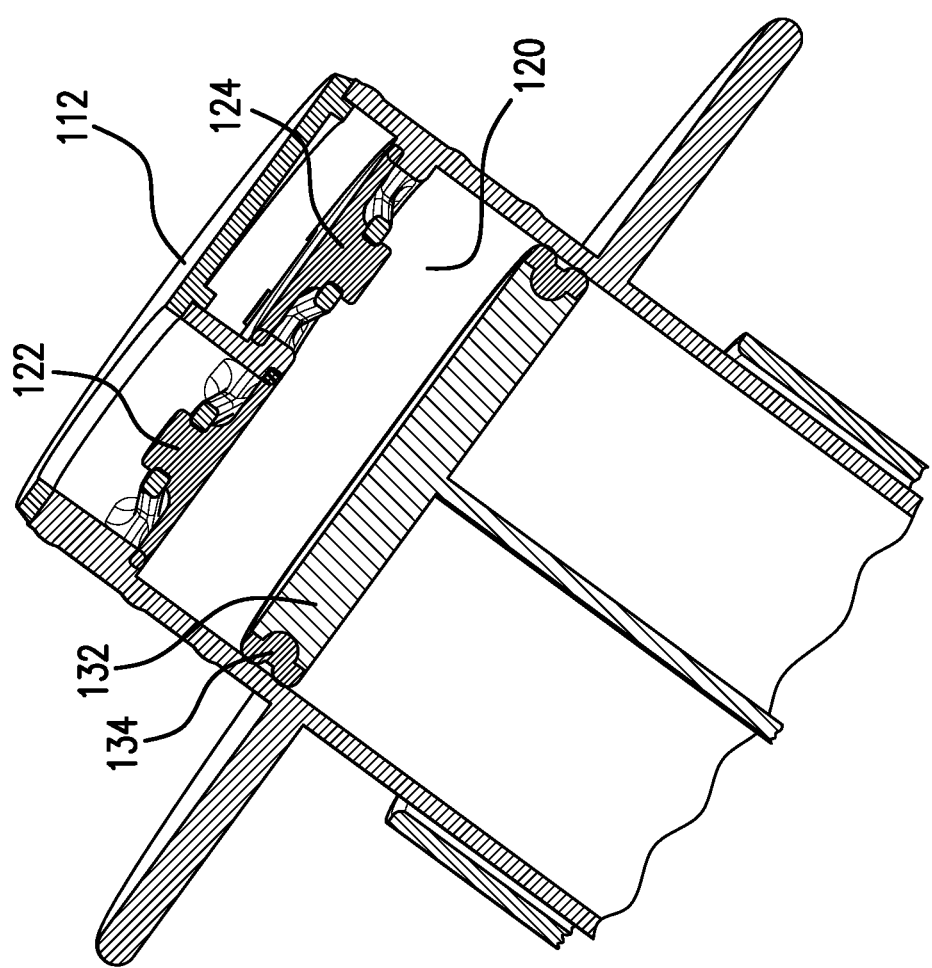
FIG. 7 illustrates a cross-sectional view of the dispenser of FIG. 6 during fluid moving out of the first chamber according to an embodiment of the disclosure.
Figure 8:
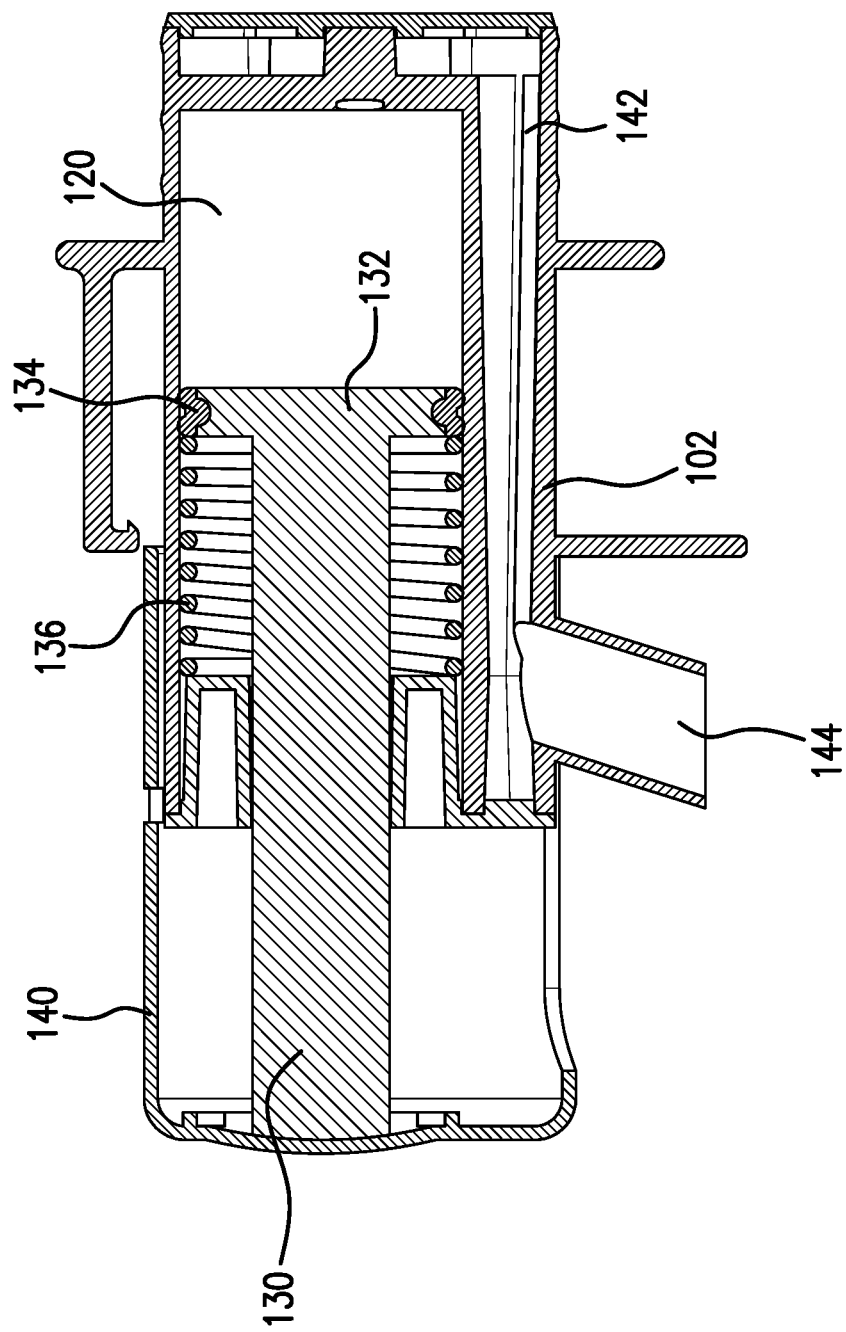
FIG. 8 illustrates a side cross-sectional view of a dispenser according to an embodiment of the disclosure.

FIG. 7 shows the dispenser 100 as the plunger 130 moves toward the distal end 112. As the plunger 130 moves, the volume in the pressure in the first chamber 120 decreases, and the second valve 124 may elastically deform in a similar manner to the first valve 122 described above to allow the fluid to leave the first chamber 120. As pressure within the first chamber 120 increases above a threshold high pressure, the deformation of the second valve 124 un-obstructs the second opening 110 and permits the fluid to flow therethrough. The fluid may then flow to a desired destination or into another chamber, for example, into the intermediate chamber 142. When pressure within the first chamber 120 drops below the threshold high pressure, the second valve 124 returns to its un-deformed state such that the second opening 110 is obstructed by the second valve 124 and fluid cannot flow through the second opening 110.

The dispenser 100 as described in the embodiments throughout this application may be used for movement of a fluid, for example a liquid, from a source to a desired destination. While this disclosure is not intended to be limited by the specific liquids being dispensed, examples of suitable fluids include low-viscosity liquids, such as water, wine, juice, carbonated beverages, and combinations of the above, and high-viscosity solutions, such as ketchup, mayonnaise, mustard, or other condiments or dipping sauces.

In operation, the plunger 130 may be actuated to cause the desired fluid to move into the dispenser 100 from a fluid source and to move the fluid within the dispenser 100 to a desired destination, for example a cup, plate, bottle, or another suitable reservoir for the particular substance being dispensed.

When actuated, the plunger 130 may move a liquid within the first chamber 120 in the direction of one or more openings, for example, toward second opening 110. The dispenser 100 may include a filling mode, in which fluid is moved into the first chamber 120, and a dispensing mode, in which fluid is moved out of the first chamber 120. In the dispensing mode, the plunger 130 may be moved in the first direction such that pressure increases in the first chamber 120 and fluid is moved from the first chamber 120. In the filling mode, the plunger 130 may be moved in the second direction opposite the first direction. This movement decreases pressure in the first chamber 120, resulting is fluid entering the first chamber 120.

It will be understood that the dispenser 100 and its components are scalable and may be dimensioned to fit desired applications and liquid sources. In some embodiments, the body 102 may be cylindrical. The body 102 may be between about 0.5 inches to about 6 inches in length, between about 1 inches and about 4 inches, or between about 2 inches and about 3 inches. The diameter of the body 102 may be between about 0.25 inches and about 3 inches, between about 0.75 inches and about 2 inches, and between about 1 inches and about 1.5 inches. In some exemplary embodiments, the body 102 may be about 2.1 inches in length and about 1.13 inches in diameter.

The dispenser 100 may be dimensioned within the above-described ranges. In an exemplary embodiment, the dispenser (spanning from the distal end 112 to the handle 140) may be about 2.5 inches. It will be understood that the specific sizes may vary depending on the desired application.

The dispenser 100 may be a part of a system 200. The system 200 may include a source of fluid 202 and one or more dispensers 100 configured to move at least a portion of the fluid from the source of fluid 202 into, through, and out of each dispenser 100. In some embodiments, the system 200 may include one or more attachments to facilitate movement of fluid into the dispenser 100, such as a rigid or a flexible tube fluidly connecting the first opening 108 of the dispenser 100 with the source of fluid 202. In some embodiments, the system 200 may include one or more attachments to facilitate movement of fluid from the dispenser 100 to a desired destination, such as a rigid or flexible tube, a spout, or an intermediate chamber 142 that may fluidly connect a first dispenser 100 with a second dispenser 100. The one or more attachments may be removably coupleable with the dispenser 100 and/or the source of fluid 202. In some embodiments, the system 200 may include a plurality of interchangeable attachments that may be coupled or removed to components of the system 200 based on operational necessity or user preference.

This disclosure is not limited to any particular source of fluid 202, and it will be understood that the system 200 may include various types and quantities of sources of fluid 202. Examples of suitable sources of fluid 202 include, but are not limited to, bags, boxes, pouches, cartons, jugs, bowls, barrels, canister, and other suitable container for receiving, holding, transporting, and/or distributing a fluid. In some embodiments, the source of fluid 202 may include one or more components of the system 200, for example, a dispenser 100.

It will be appreciated that various embodiments of the dispenser 100 and the system 200 are covered by this disclosure. In some embodiments, the arrangement of the components described throughout this specification may differ, for example, being disposed on at a different portion of the dispenser.

It will be understood that referenced components may include the same features as similarly-named components described throughout this disclosure. In some embodiments, the dispenser 100 may include a first opening 108 through which a fluid may enter the first chamber 120 and a second opening 110 through which the fluid may exit the chamber 120. The first opening 108 may include a first valve 122. The second opening 110 may include a second valve 124. The first valve 122 and the second valve 124 may include an elastically deformable portion configured to deform or deflect upon application of a suitable force. The dispenser 100 may further include a plunger 130 having a plunger head 132.

In some aspects, the plunger head 132 may include one or more plunger openings extending through the plunger head 132. The dispenser 100 may include an intermediate chamber 142. In some embodiments, the intermediate chamber 142 and the first chamber 120 may be separated by the plunger head 132, such that the first chamber 120 and the intermediate chamber 142 fluidly communicate with each other via the plunger openings extending through the plunger head 132. The plunger head 132 may further include a plunger valve. The plunger valve may be a one-way valve and may be substantially similar to the first and second valves 122,124 described herein. The plunger head 132 may have a plurality of plunger valves, for example, a plunger valve being disposed in or adjacent to each plunger opening. The plunger valve is configured to open when a sufficient force gradient is applied in one direction on the plunger head 132 and to close when the force gradient is applied in a second direction opposite the first direction.

In operation, fluid may be introduced into the first chamber 120 through the first opening 108 and the first valve 122 by moving the plunger 130 in a filling direction. When fluid is present within the first chamber 120, the plunger 130 may be moved in a dispensing direction opposite the filling direction. When sufficient pressure has built up in the first chamber 120 during this movement, the plunger valves may open, and the fluid may move through the plunger openings from the first chamber 120 to the intermediate chamber 142. As the fluid is within the intermediate chamber, the plunger 130 may be moved again in the filling direction. This causes fluid to again enter the first chamber 120 through the first opening 108. Pressure in the intermediate chamber 142 increases during this movement, the second valve 124 opens, and the fluid within the intermediate chamber 142 moves through the second opening 110 out of the dispenser 300. In some embodiments, the dispenser 300 may further include a handle 140 fixedly attached to the plunger 130.

In some embodiments, the dispenser may include a locking component for preventing the dispenser from being actuated. This may be advantageous for when the dispenser is being stored, shipped, or connected to fluid sources and/or destination in order to prevent damage to the components of the dispenser or to prevent premature or inadvertent dispensing of fluid. Referring to FIG. 1, for example, a locking protrusion 148 may extend from the body 102 and may be configured to engage with a locking receptacle 149 disposed on the handle 140. When the locking protrusion 148 is engage with the locking receptacle 149, the handle 140 is prevented from being moved to induce fluid flow through the dispenser 100. It will be understood that other locking methods are suitable.

While the disclosure has been described in connection with the various embodiments of the various figures, it will be appreciated by those skilled in the art that changes could be made to the embodiments described above without departing from the broad inventive concept thereof. It is understood, therefore, that this disclosure is not limited to the particular embodiments disclosed, and it is intended to cover modifications within the spirit and scope of the present disclosure as defined by the claims.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning as would be understood by those skilled in the relevant art. However, so as to avoid misunderstanding, the meanings of certain terms has been specifically defined or clarified.

What is claimed:

1. A dispenser for dispensing a fluid, the dispenser comprising:
 a body having an exterior surface and an interior surface defining a first chamber;
 a first opening extending through the body between the exterior surface and the interior surface, the first opening being in fluid communication with the first chamber;
 a second opening extending through the body between the exterior surface and the interior surface, the second opening being in fluid communication with the first chamber;
 a first valve disposed on the body, the first valve having a closed configuration and an open configuration;
 a second valve disposed on the body, the second valve having a closed configuration and an open configuration;
 an actuator disposed at least partially within the first chamber, the actuator configured to operatively increase and decrease pressure in the first chamber such that the first valve and the second valve change from their respective closed configurations to their respective open configurations and from their respective open configurations to their respective closed configurations; and
 a second chamber in fluid communication with the first chamber,
 wherein when the first valve is in the closed configuration, the first opening is substantially impeded such that fluid does not pass through the first opening, and when the first valve is in the open configurations, the first opening is substantially unimpeded such that the fluid can pass through the first opening, wherein when the second valve is in the closed configuration, the second opening is substantially impeded such that fluid does not pass through the second opening, and when the second valve is in the open configurations, the second opening is substantially unimpeded such that the fluid can pass through the second opening.

2. The dispenser of claim 1, further comprising a handle operatively connected to the actuator, the handle configured to convey a pushing force on the actuator in a first direction toward a distal end of the body and a pulling force on the actuator in a second direction opposite the first direction toward a proximal end of the body.

3. The dispenser of claim 1, wherein the actuator is a plunger having a plunger head, wherein the plunger head slidably contacts the interior surface of the body.

4. The dispenser of claim 3, further comprising a sealing member disposed adjacent the plunger head and the interior surface of the body, the sealing member being configured to prevent the fluid from moving past the sealing member.

5. The dispenser of claim 1, wherein the first valve and the second valve include an elastically deformable element configured to deform in the application of a pressure greater than a threshold deformation pressure, and further configured to return to its un-deformed state upon such a decrease of applied pressure below the threshold deformation pressure.

6. The dispenser of claim 5, wherein when the deformable element of the first and second valves is in the deformed state, the first and second openings, respectively, are unimpeded such that fluid can flow therethrough, and when the deformable element is in the un-deformed state, the first and second openings are impeded such that fluid cannot flow therethrough.

7. The dispenser of claim 1, further comprising a spring element configured to bias the actuator in a first direction toward a distal end of the body or in a second direction opposite the first direction toward a proximal end of the body.

8. The dispenser of claim 7, wherein the spring element is a helical spring.

* * * * *